Patented Nov. 23, 1943

2,334,904

UNITED STATES PATENT OFFICE 2,334,904

RESINOUS COMPOSITION

Harold C. Cheetham, Philadelphia, Pa., assignor to The Resinous Products & Chemical Company, Philadelphia, Pa., a corporation of Delaware No Drawing. Application September 27, 1940, Serial No. 358,657

11 Claims. (Cl. 260—45)

This invention relates to an improved method of accelerating the hardening of resinous condensation products of the type which cure more rapidly in the presence of an acid catalyst.

It is known that certain types of resinous condensates such as the phenol-formaldehyde and urea-formaldehyde condensates cure more rapidly if the pH of the material is on the acid side. Similarly, it is known that if condensation products of this type are to be held at an intermediate stage for any length of time they must be kept substantially neutral. Because of these facts it has been common practice in industry to neutralize the partial condensates and then, just prior to their being used, to add an acidic substance. However, if free acids are mixed with the partial condensates, difficulties are encountered in obtaining a uniform mixture prior to the catalytic effect taking place, and, hence, particularly in the case of urea-formaldehyde condensates, the usual practice has been to add a compound, such as an ammonium salt, which liberates an acid gradually. This practice is particularly effective when heat is applied to cure the resin but is sometimes too slow and uncertain in the so-called "cold cure" process. It also has the disadvantage that it requires an accurate measuring of the quantity of catalyst to be added just prior to the use of the intermediate condensate.

The object of this invention is to provide a method of incorporating an acidic material in an uncured resinous composition which avoids the difficulties encountered when free acids are added, but which does not require heat or a lapse of time to liberate the acid. It is also an object to provide a method of incorporating the appropriate amount of an acid in an uncured resinous composition without the need of an accurate measurement just prior to its use.

In accordance with the invention these objects are accomplished by utilizing a cation-exchange material in its hydrogen form and a neutral salt to form a free acid within the partially condensed resinous composition. Neither the cation-exchange material nor the neutral salt alone has any effect upon the stability of the condensate, and, hence, either may be added to the resinous composition at any stage after its manufacture. The second component may then be added just prior to the resin being cured. If the first component is added in an appropriate, measured amount, the second component may be added in excess without danger of incorporating too much acid. The excess remains as unchanged inert material. The free acid is formed by the cation-exchange material absorbing or taking up the positive ions of the salt and replacing them with hydrogen ions by a chemical reaction which may be represented by the equation:

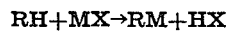
$$RH + MX \rightarrow RM + HX$$

wherein R represents the nucleus of the cation-exchange material, RH the material in its hydrogen form and M and X the positive and negative components respectively of the neutral salt. Since heat is not needed to cause this reaction, the acid, HX, is formed immediately upon the positive ions of the neutral salt coming in contact with the cation-exchange material. Furthermore, the acid is formed only when the reactants come in contact, and, hence, if one reactant is well distributed throughout the resinous material, there is no danger of a local excess of catalyst being present during mixing.

The condensates to which the present invention may be applied are the broad class of thermo-setting resins which cure more rapidly in the presence of an acid catalyst. While all these resins are thermo-setting resins, it should be understood that heat is not always needed to cure them, particularly when an acid catalyst is added. A feature of the present invention is that by means of it a method is provided for incorporating in these resinous condensates, without danger of premature gelation, a sufficient amount of acid catalysts to promote a rapid cure of the resin at room temperatures. Besides the phenol-formaldehyde and urea-formaldehyde resins heretofore mentioned, the invention may be applied to the condensation products of aldehydes with phenols or urea, or to condensation products of aldehydes with other carbamides such as thiourea, alkyl- or phenyl-substituted ureas, amides of various dibasic acids, etc. It may also be applied to the aldehyde condensation products of such other resin-forming materials as aniline, dicyandiamide, ammonium thiocyanate, guanidine, the triazines, such as melamine, melam, ammeline, ammelide, substituted amino-triazines such as 2-phenyl-4-amino-6-hydroxy-1,3,5-triazines, mono-, di-, or tri-alkyl melamines, thioammeline and thioammeline ethers such as S-benzyl-thioammeline and bis-thioammeline diethyl ether. The aldehyde component of these various resins is usually formaldehyde but other aldehydes such as acetaldehyde, butyraldehyde, benzaldehyde, etc. may also be used. The invention may also be applied to resins made from mixtures of these various resin-forming ingredients.

The cation-exchange material preferably used is a sulfited phenol-formaldehyde resin of the type described in U. S. Patent No. 2,191,853 but other hydrogen exchangers may also be used such as the polyhydric phenol-formaldehyde condensates disclosed in U. S. Patent No. 2,104,501 and the carbonaceous hydrogen exchangers made from such materials as lignin, peat, coal, wood, etc. In general, any water-insoluble material capable of exchanging its hydrogen ions for metal ions of a salt solution by mere contact therewith may be used in practicing the invention. Preferably the cation-exchange material should be in a finely powdered condition so that it may be readily dispersed throughout the resin or resin solution.

The salts which may be used in practicing the invention are the water-soluble salts of water-soluble acids having dissociation constants above $10^{-6}$. Both the salt and the acids, however, need be only sufficiently soluble in water to produce the acidity required to accelerate condensation of the resin which, as is known to the art, is relatively low. As representative of suitable salts, there may be mentioned the sodium, potassium, zinc or calcium salts of such acids as sulfuric, hydrochloric, nitric, phosphoric, oxalic, phthalic, lactic and acetic acids. The salt may be added to the resin in solid form or as solution or may be incorporated by neutralizing an acid used in the initial condensation of the resin. When the resin contains a salt by reason of its preparation, the cation-exchange material should not be added until the resin is to be used.

A further feature of the invention insofar as it applies to dry, hardenable resins is that since the presence of water is needed to effect an ion-exchange between neutral salt and ion-exchange resin, a dry mixture of hardenable resin, neutral salt, and ion-exchange resin can be prepared and the catalyst generated by merely moistening the dry mixture.

The following examples are given to illustrate the invention.

Example 1

A urea-formaldehyde condensate was prepared by dissolving one mol of urea in two mols of 30% aqueous formaldehyde, adjusting the pH of the solution to approximate neutrality, and heating the solution at 85–95° C. until a viscous solution resulted. The reaction mixture was cooled to 30–40° C. and concentrated under reduced pressure to a solids content of about 65%. To 100 parts of this viscous solution was added with stirring 20 parts of a slurry containing 15 parts of water and 5 parts of a finely powdered sulfonated soft coal exchanger in its hydrogen form. When 5 to 8 parts of sodium chloride was added to the solution, gelling occurred within 2 to 4 minutes. The solution free from salt did not change over a long period of time. Addition of an amount of hydrochloric acid equivalent to the sodium chloride caused the separation of flocs and curds.

Example 2

A mixture of one mol of urea and 1.7 mols of formaldehyde in 37% aqueous solution was treated with activated charcoal and filtered. There were then added 0.2 mol of thiourea and 5% of calcium chloride, based on the weight of the carbamides. The temperature was then maintained at 85° C. for two hours, cooled to about 40° C., and concentrated under reduced pressure to a 70% solids content. To 100 grams of this solution there were added 17 grams of water and three grams of a powdered resin prepared by condensing sulfited catechol and formaldehyde, leaching the resin with 1% sulfuric acid solution, and washing with water. This material was divided into portions, the first being set aside without further treatment while to the second there was added two grams of sodium chloride in a saturated solution. The first sample gelled in two hours; the second sample gelled in about three minutes. The time required for gelation in each case was lengthened by adding small amounts of ammonia to the mixture.

Example 3

A viscous, commercial solution of the condensate of urea and formaldehyde essentially salt-free, having a solids content of 60%, was treated with 5% of its weight of powdered resin obtained by the condensation of quebracho and formaldehyde which had been leached with a 5% solution of hydrochloric acid and washed with water. There was no tendency shown for the resulting suspension to harden. There was then added to 100 parts of the suspension eight parts of a finely ground mixture containing equal weights of sodium acetate and calcium chloride. The resulting material was spread on $\frac{1}{16}$-inch veneer sheets at the rate of 0.03 lb. per sq. foot. The sheets were assembled, pressed together, and clamped. After four hours when the clamps were removed, the sheets were found firmly joined.

Example 4

A mixture of 100 parts of phenol, 128 parts of 30% formaldehyde solution and 5 parts of ammonium hydroxide solution was heated for five hours at 55° C. The oily condensate resulting and the water were separated. The condensate was washed with dilute acetic acid solution to yield a substantially neutral, stable product. A sample of 100 grams of this product plus 20 grams of glycerin was dilute with denatured alcohol to a 60% solids content. To this was added five grams of a sulfited quebracho-formaldehyde condensate which had been leached with 5% phosphoric acid, and washed with water. The mixture was still stable. There was then thoroughly mixed therewith five grams of finely ground sodium chloride and the product used for binding carborundum grits on paper.

Another 100 gram sample of the neutralized condensate was adjusted with glycerine to about 60% solids content and five grams of the same powdered sulfited quebracho-formaldehyde resin mixed therewith. There was then added five grams of powdered sodium sulfate. The resulting product was used for binding cork liners in bottle caps. The resinous condensate was rapidly insolubilized at a temperature of 250° F.

In a similar way the curing of resins may be controlled in the casting of phenol-formaldehyde resins. There may be incorporated pigments, fillers, dyes, etc. and the curing rapidly accomplished.

The compositions of this invention are useful in many kinds of applications. The solutions or pastes of resinous condensates, for instance, find an unusually valuable application in the field of adhesives. Plywood may be formed with hot- or cold-pressing. Also plywood which has been initially formed in a cold-pressing operation may be finished in a warming chamber. An adhesive tape capable of giving a water-proof bond may be prepared by coating a paper or fabric tape on one or both sides with a film of urea-formaldehyde resin containing dispersed throughout it a cation-exchange resin in its hydrogen form. By moistening this coating with a salt solution a cold-setting adhesive is obtained that forms a strong, water-resistant bond between the tape and the object to which it is applied. Textile fabrics or paper may be impregnated with an aqueous mixture of hardenable resinous condensates, cation-exchange resin, and salt and the impregnated material cured at a relatively low temperature. There may also be prepared laminated products of excellent hardness and gloss under highly favorable conditions of curing. The solutions of hardenable resins may be used as coating, sealing, and filling materials. This invention also provides novel means of casting resins into useful forms.

The compositions comprising an acid-hardenable resinous material, a cation-exchange material, and a salt are advantageous in that rapid curing is obtained therewith without curling, segregation or premature gelation of the material. Low temperature cures become more effective without danger from the action of free, strong acids. The compositions are convenient to handle, easy to prepare, and free from the usual difficulties encountered with free acids as catalysts. The compositions may, furthermore, be flexibly adjusted by choice of salt or salts and by regulation of the amount of salt or salts used.

I claim:

1. A method of incorporating an acid catalyst in a thermosetting resin which cures more rapidly in the presence of an acid which comprises mixing with said resin a powdered cation-exchange material in its hydrogen form and a water-soluble salt of a water-soluble acid having a dissociation constant above $10^{-6}$.

2. A method of incorporating an acid catalyst in a thermosetting resin which cures more rapidly in the presence of an acid which comprises mixing with said resin a powdered cation-exchange material in its hydrogen form and adding to the mixture just prior to its use a water-soluble salt of a water-soluble acid having a dissociation constant above $10^{-6}$ and a small amount of ammonia.

3. A method of incorporating an acid catalyst in a carbamide-aldehyde condensate which comprises mixing with said condensate a powdered cation-exchange material in its hydrogen form and adding to the mixture thus produced just prior to its use a neutral water-soluble salt of a water-soluble acid.

4. A method of incorporating an acid catalyst in a urea-formaldehyde condensate which comprises mixing with a solution of said condensate a powdered phenol-formaldehyde cation-active resin in its hydrogen form and adding to the resulting mixture a small amount of a neutral water-soluble salt of a water-soluble acid.

5. The method of claim 4 in which the phenol-formaldehyde resin is one made from quebracho.

6. A composition comprising a dry mixture of a thermosetting resin which cures more rapidly in the presence of an acid, a powdered cation-exchange material in its hydrogen form and a water-soluble salt of a water-soluble acid.

7. A dry mixture of a carbamide-aldehyde condensate, a cation-exchange material in its hydrogen form, and a neutral water-soluble salt of a water-soluble acid having a dissociation constant above $10^{-6}$.

8. A dry mixture of a carbamide-aldehyde condensate, a powdered, water-insoluble, sulfited phenol-formaldehyde cation-exchange material in its hydrogen form, and a neutral water-soluble salt of a water-soluble acid having a dissociation constant above $10^{-6}$.

9. A solution of a carbamide-aldehyde condensate having dispersed therein a powdered, water-insoluble, sulfited phenol-formaldehyde cation-exchange material in its hydrogen form and a neutral water-soluble salt of a water-soluble acid having a dissociation constant above $10^{-6}$.

10. A method of incorporating an acid catalyst in a thermosetting resin which cures more rapidly in the presence of an acid, which comprises mixing with said resin a powdered, water-insoluble, sulfited phenol-formaldehyde cation-exchange material in its hydrogen form and a water-soluble salt of a water-soluble acid having a dissociation constant above $10^{-6}$.

11. A method of incorporating an acid catalyst in a thermosetting resin, which cures more rapidly in the presence of an acid, which comprises mixing with said resin a powdered, water-insoluble, sulfited phenol-formaldehyde cation-exchange material in its hydrogen form, and adding to the mixture just prior to its use a water-soluble salt of a water-soluble acid having a dissociation constant above $10^{-6}$.

HAROLD C. CHEETHAM.